(12) United States Patent
Krishna et al.

(10) Patent No.: US 8,149,142 B2
(45) Date of Patent: Apr. 3, 2012

(54) ADAPTIVE RANGE VEHICLE LOCATING UNIT, VEHICLE TRACKING UNIT AND VEHICLE RECOVERY SYSTEM INCLUDING SAME

(75) Inventors: Sampath Krishna, Winchester, MA (US); Jesse Rhodes, Franklin, MA (US)

(73) Assignee: LoJack Operating Company, L.P., Canton, MA (US)

( * ) Notice: Subject to any disclaimer, the term of this patent is extended or adjusted under 35 U.S.C. 154(b) by 1049 days.

(21) Appl. No.: 11/716,793

(22) Filed: Mar. 12, 2007

(65) Prior Publication Data

US 2008/0224895 A1 Sep. 18, 2008

(51) Int. Cl.
*G08G 1/123* (2006.01)

(52) U.S. Cl. .................. 340/991; 340/10.1; 340/539.23; 340/568.1; 342/357.54

(58) Field of Classification Search .................. 340/10.1, 340/539.13, 539.23, 568.1, 568.2, 991–993; 342/357.01–357.09, 357.2, 357.21, 357.25, 342/357.31, 357.34, 357.54, 357.63, 357.65, 342/357.71, 357.75, 357.77, 457, 414; 455/266
See application file for complete search history.

(56) References Cited

U.S. PATENT DOCUMENTS

| | | | |
|---|---|---|---|
| 4,177,466 A | 12/1979 | Reagan | |
| 4,818,988 A | 4/1989 | Cooperman et al. | |
| 4,908,609 A | 3/1990 | Stroomer | |
| 5,499,394 A * | 3/1996 | Kaatz et al. | ................... 455/266 |
| 5,704,008 A | 12/1997 | Duvall, Jr. | |
| 5,917,423 A | 6/1999 | Duvall | |
| 6,229,988 B1 | 5/2001 | Stapefeld et al. | |
| 6,522,698 B1 | 2/2003 | Irving et al. | |
| 6,665,613 B2 | 12/2003 | Duvall | |
| 6,970,685 B2 * | 11/2005 | Milbar et al. | ................... 455/266 |
| 2006/0164292 A1 * | 7/2006 | Buechler et al. | ................. 342/52 |
| 2007/0046459 A1 * | 3/2007 | Silverman et al. | ........ 340/539.13 |
| 2009/0215408 A1 * | 8/2009 | Evers et al. | ................... 455/90.1 |

FOREIGN PATENT DOCUMENTS

| WO | WO 98/59256 A2 | 12/1998 |
|---|---|---|
| WO | WO 00/37960 A2 | 6/2000 |
| WO | WO 2007017464 A1 * | 2/2007 |

* cited by examiner

*Primary Examiner* — Daniel Wu
*Assistant Examiner* — Nay Tun
(74) *Attorney, Agent, or Firm* — Iandiorio Teska & Coleman, LLP

(57) ABSTRACT

An adaptive range vehicle recovery system including an adaptive range vehicle locating unit including a narrowband baseband generator for generating a narrowband signal, a wideband baseband generator for generating a wideband signal, a timing control circuit responsive to an activation signal to transmit, alternately, said narrowband signal at a first rate, and said wideband signal at a second rate and responsive to a track signal to transmit one of said wideband and narrowband signals at a third, different, rate; and also to an adaptive range vehicle recovery system including an adaptive range vehicle track unit including a data decoder including, a wideband decoder for detecting data from a wideband baseband signal, a narrowband decoder for detecting data from a narrowband baseband signal, a bandwidth detector responsive to a received signal to distinguish narrowband and wideband signals and an input switching circuit responsive to said bandwidth detector for directing the wideband signal to the wideband decoder and the narrowband signal to the narrowband decoder.

34 Claims, 8 Drawing Sheets

Alternating wideband/narrowband Tx module
Example of "dual" range implementation Alternating wideband/narrowband Tx module
Example of "dual" range implementation

ADAPTIVE RANGE VEHICLE LOCATING UNIT, VEHICLE TRACKING UNIT AND VEHICLE RECOVERY SYSTEM INCLUDING SAME

FIELD OF THE INVENTION

This invention relates to an adaptive range vehicle locating unit and to such a vehicle locating unit which can be more easily located by a vehicle tracking unit in a vehicle recovery system.

BACKGROUND OF THE INVENTION

The applicant's successful and popular vehicle recovery system sold under the trademark LoJack® includes a small electronic vehicle locating unit (VLU) with a transceiver hidden within a vehicle, a private network of communication towers each with a remote transmitting unit (RTU), one or more law enforcement vehicles equipped with a vehicle tracking unit (VTU), and a network center with a database of customers who have purchased a VLU. The network center interfaces with the National Criminal Information Center. The entries of that database comprise the Vehicle Identification Number (VIN) of the customer's vehicle and an identification code assigned to the customer's VLU.

When a LoJack® product customer reports that her vehicle has been stolen, the VIN of the vehicle is reported to a law enforcement center for entry into a database of stolen vehicles. The network center includes software that interfaces with the database of the law enforcement center to compare the VIN of the stolen vehicle with the database of the network center which includes VIN corresponding to VLU identification codes. When there is a match between a VIN of a stolen vehicle and a VLU identification code, as would be the case when the stolen vehicle is equipped with a VLU, and when the center has acknowledged the vehicle has been stolen, the network center communicates with the RTUs of the various communication towers (currently there are about 180 nationwide) and progressively each tower transmits a message to activate the transceiver of the particular VLU bearing the identification code.

The transceiver of the VLU in the stolen vehicle is thus activated and begins transmitting its unique VLU identification code. The VTU of any law enforcement vehicle proximate the stolen vehicle receives this VLU transceiver code and, based on signal strength and directional information, the appropriate law enforcement vehicle can take active steps to recover the stolen vehicle. See, for example, U.S. Pat. Nos. 4,177,466; 4,818,988; 4,908,609; 5,704,008; 5,917,423; 6,229,988; 6,522,698; and 6,665,613 all incorporated herein by this reference.

Presently the VLU when activated sends a wideband e.g., 15 kHz signal with substantial data identifying the stolen vehicle. In Europe the wideband signal is somewhat lower e.g. approximately 11 kHz. When the VTU detects this, the officer in the tracking vehicle calls in the acquisition and then the VLU is triggered to begin transmitting more frequently e.g., from an initial rate of 4/min to the increased rate of 60/min. One shortcoming of this is that the wideband signal has a range of only about a mile. Thus the police cruiser with the VTU must generally be within a mile or so of the stolen vehicle to pick up the low band signal. Thus a larger number of VTUs are required to monitor a given area because of the short range.

BRIEF SUMMARY OF THE INVENTION

It is therefore an object of this invention to provide an improved adaptive range vehicle locating unit.

It is a further object of this invention to provide an improved adaptive range vehicle tracking unit.

It is a further object of this invention to provide an improved adaptive range vehicle recovery system using such a vehicle locating unit and vehicle tracking unit.

It is a further object of this invention to provide such an improved adaptive range vehicle locating unit which substantially increases the range at which a vehicle tracking unit can detect a vehicle locating unit.

It is a further object of this invention to provide such an improved adaptive range vehicle locating unit which dramatically reduces the number of vehicle tracking units required to monitor a given area for activated vehicle locating units.

The invention results from the realization that an improved vehicle locating unit which increases the range at which a vehicle tracking unit can detect an activated vehicle locating unit and decreases the number of vehicle tracking units required to monitor a given area can be achieved with a narrowband baseband generator for generating a narrowband signal, a wideband baseband generator for generating a wideband signal, and a timing control circuit responsive to an actuation signal to transmit, alternately, the narrowband signal and the wideband signal at a first rate; and responsive to a track signal to transmit the wideband signal at a second higher rate or a different rate.

This invention features an adaptive range vehicle locating unit including a narrowband baseband generator for generating a narrowband signal; a wideband baseband generator for generating a wideband signal; and a timing control circuit responsive to an activation signal to transmit, alternately, the narrowband signal at a first rate, and the wideband signal at a second rate and responsive to a track signal to transmit one of the wideband and narrowband signals at a third, different, rate.

In a preferred embodiment the first rate and second rate may be the same. The third rate may be higher than the first and second rate. The timing control circuit may be responsive to the track signal to turn off the narrowband circuit effectively setting the third rate to zero. The timing control circuit may be responsive to the track signal to change the wideband signal from the second rate to the third rate which is higher. The timing control circuit may be responsive to the track signal to keep the wideband signal at the second rate or change it to a the third rate which is higher and change the narrowband signal rate to a fourth rate other than the third rate. The timing control circuit may be responsive to the track signal to keep the wideband signal at the second rate or change it to a narrowband signal at the first rate. The first rate and the second rate may be approximately four times a minute. The second rate may be approximately four times a minute. The first rate may be approximately four times per minute and the second rate may be changed to the third rate which is approximately sixty times per minute. The third rate may be one of approximately four times per minute and approximately sixty time a minute and the fourth rate may be neither. The narrowband baseband may be approximately 50 Hz. The wideband baseband may be approximately 1200 Hz. The narrowband baseband signal may carry general data identifying the signal as from a vehicle locating unit. The wideband baseband signal may carry unique data identifying the vehicle in which the vehicle locating unit is disposed.

This invention also features an adaptive range vehicle tracking unit including a data decoder including a wideband decoder for detecting data from a wideband baseband signal, a narrowband decoder for detecting data from a narrowband baseband signal; and a bandwidth detector responsive to a received signal to distinguish narrowband and wideband signals and an input switching circuit responsive to the bandwidth detector for directing the wideband signal to the wideband decoder and the narrowband signal to the narrowband decoder.

In a preferred embodiment the data decoder may further include a second switching circuit responsive to the bandwidth detector for selecting the output of the narrowband or wideband decoder corresponding to the decoder to which the received signal was directed. The data decoder may further include a microprocessor and the second switching circuit may connect the selected decoder output to the microprocessor. The narrow band signal may be an approximately 625 Hz signal with an approximately 50 Hz baseband and the wideband signal may be an approximately 15 kHz signal with an approximately 1200 Hz baseband. The narrowband baseband signal may carry general data identifying the signal as from a vehicle locating unit. The wideband baseband signal may carry unique data identifying the vehicle in which the vehicle locating unit is disposed.

This invention features an adaptive range vehicle recovery system including an adaptive range vehicle locating unit including a narrowband baseband generator for generating a narrowband signal, a wideband baseband generator for generating a wideband signal, a timing control circuit responsive to an activation signal to transmit, alternately, the narrowband signal at a first rate, and the wideband signal at a second rate and responsive to a track signal to transmit one of the wideband and narrowband signals at a third, different, rate; and an adaptive range vehicle track unit including a data decoder including, a wideband decoder for detecting data from a wideband baseband signal, a narrowband decoder for detecting data from a narrowband baseband signal, a bandwidth detector responsive to a received signal to distinguish narrowband and wideband signals and an input switching circuit responsive to the bandwidth detector for directing the wideband signal to the wideband decoder and the narrowband signal to the narrowband decoder.

In a preferred embodiment the narrowband signal may be turned off in response to the track signal. The narrowband signal may be continued to be transmitted at the first rate in response to the track signal. The narrowband signal may be transmitted at a third rate in response to the track signal. The first rate may be approximately four times per minute. The second rate may be approximately sixty times per minute. The narrowband baseband may be approximately 50 Hz. The wideband baseband may be approximately 1200 Hz. The narrowband baseband signal may carry general data identifying the signal as from a vehicle locating unit. The wideband baseband signal may carry unique data identifying the vehicle in which the vehicle locating unit is disposed. The data decoder may further include a second switching circuit responsive to the bandwidth detector for selecting the output of the narrowband or wideband decoder corresponding to the decoder to which the received signal was directed. The data decoder may further include a microprocessor and the second switching circuit may connect the selected filter output to the microprocessor. The narrow band signal may be an approximately 625 Hz signal with an approximately 50 Hz baseband and the wideband signal may be an approximately 15 kHz signal with an approximately 1200 Hz baseband. The first rate and second rate may be the same. The third rate may be higher than the first and second rate. The timing control circuit may be responsive to the track signal to turn off the narrowband circuit effectively setting the third rate to zero. The timing control circuit may be responsive to the track signal to change the wideband signal from the second rate to the third rate which is higher. The timing control circuit may be responsive to the track signal to keep the wideband signal at the second rate or change it to the third rate which is higher and change the narrowband signal rate to a fourth rate other than the third rate. The timing control circuit may be responsive to the track signal to keep the wideband signal at the second rate or change it to a narrowband signal at the first rate.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
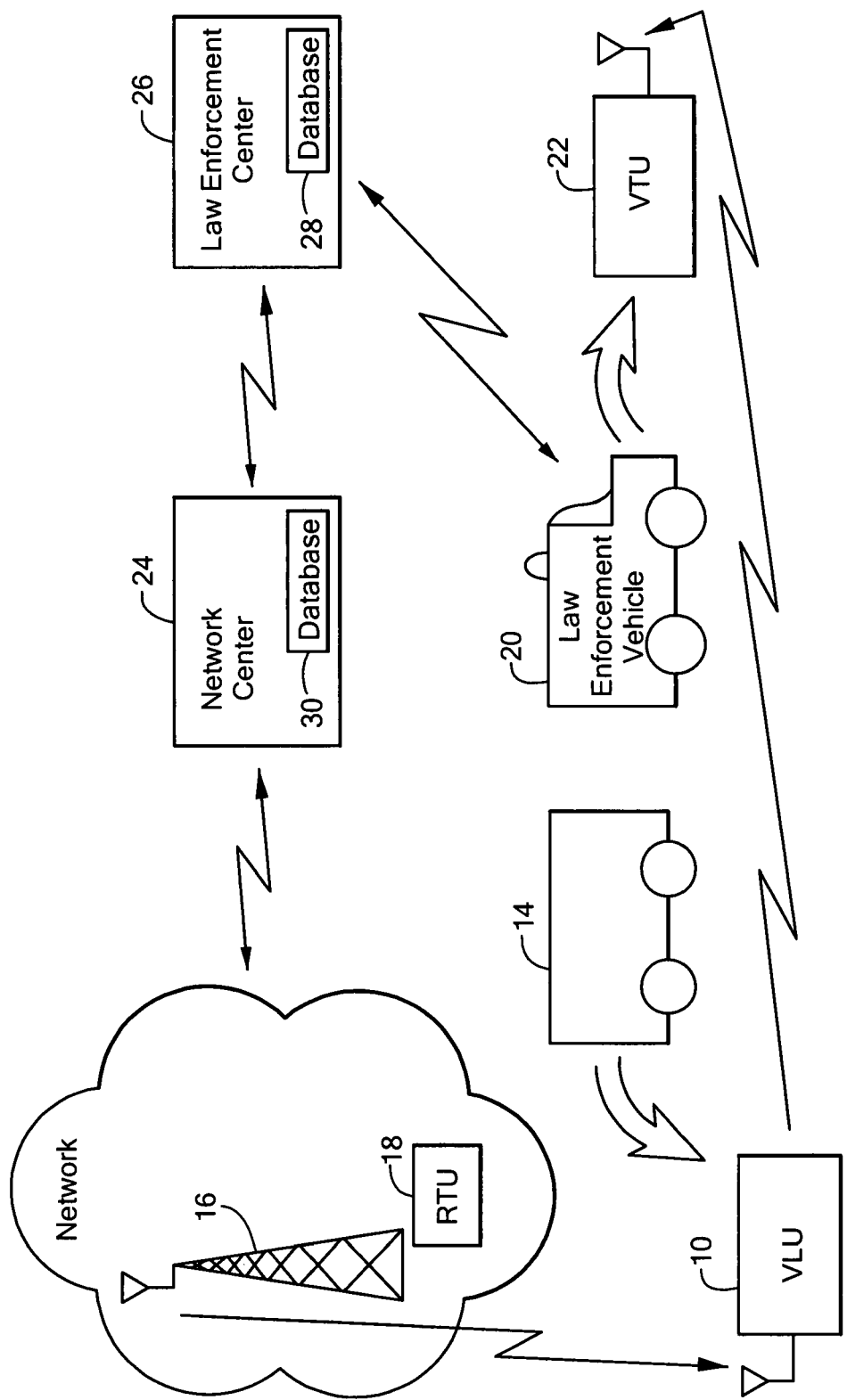
FIG. 1 is a schematic block diagram showing the primary components associated with an example of a stolen vehicle recovery system in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

As discussed in the Background above, the applicant's successful and popular vehicle recovery system sold under the trademark LoJack® includes a small electronic vehicle locating unit (VLU) 10, FIG. 1, hidden within a vehicle 14, a private network of communication towers 16, each with a remote transmitting unit (RTU) 18, one or more law enforcement vehicles 20 equipped with a vehicle tracking unit (VTU) 22, and network center 24.

When a LoJack® product customer reports that her vehicle has been stolen, the VIN of the vehicle is reported to law enforcement center 26 for entry into database 28 of stolen vehicles. Network center 24 includes software that interfaces with database 28 of law enforcement center 26 to compare the VIN of the stolen vehicle with database 30 of network center 24 which includes VIN corresponding to VLU identification codes. When there is a match between a VIN of a stolen vehicle and a VLU identification code, as would be the case when stolen vehicle 14 is equipped with VLU 10, network center 24 communicates with the RTUs 18 of the various communication towers 16 and each tower transmits a message to actuate VLU 10 bearing the particular identification code.

VLU 10 in stolen vehicle 14, once actuated, begins transmitting a unique VLU identification code. VTU 22 of law enforcement vehicle 20 proximate stolen vehicle 14 receives this VLU transponder code and, based on signal strength and directional information, the appropriate law enforcement vehicle can take active steps to recover stolen vehicle 14.

Figure 2:
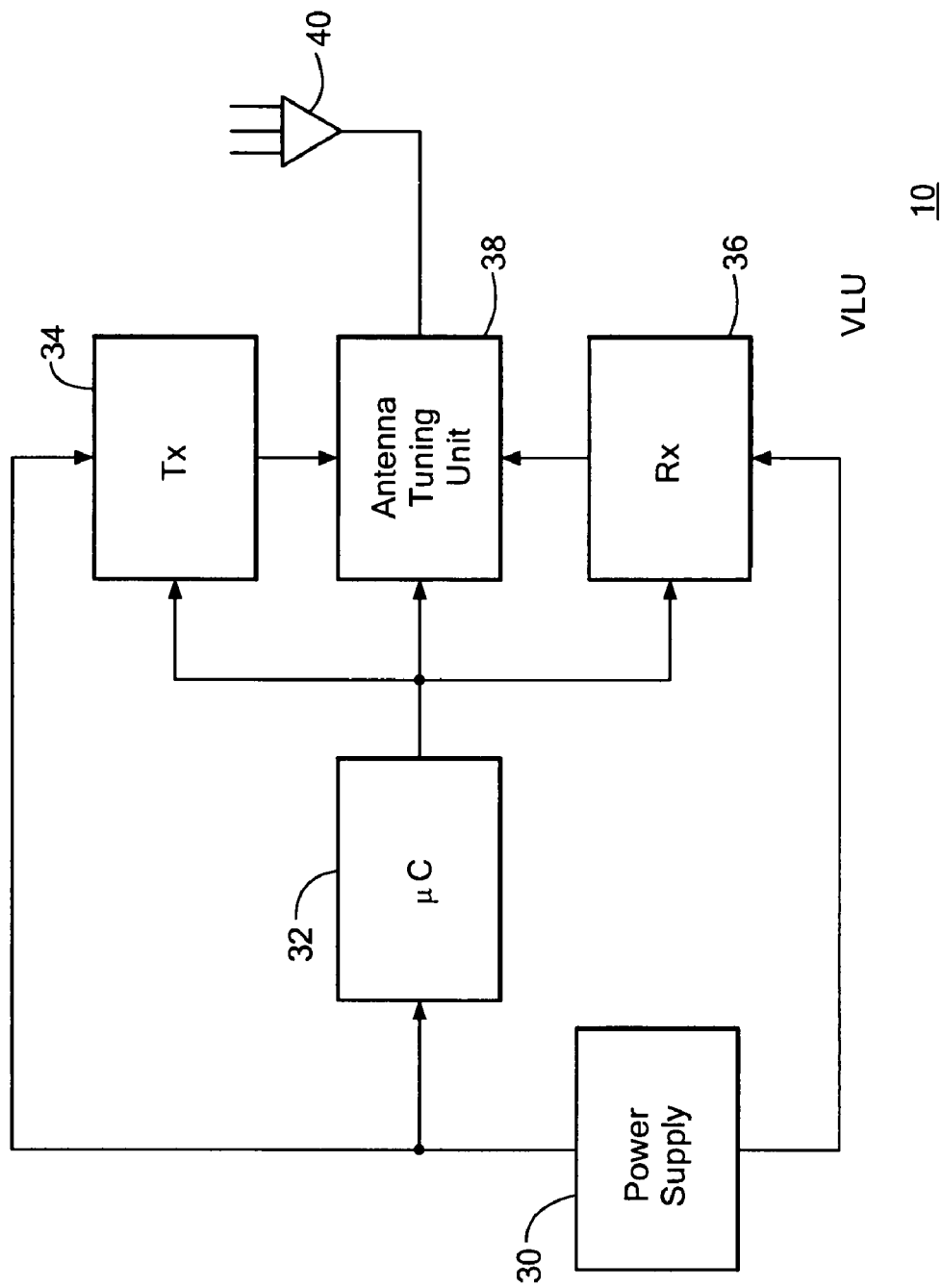
FIG. 2 is a more detailed schematic block diagram of the VLU of FIG. 1 according to this invention.

Vehicle locating unit (VLU) 10 FIG. 2, includes power supply 30, microprocessor 32, transmitter 34, receiver 36, antenna tuning unit 38 and antenna 40. Power supply 30 supplies all of the units and may include a backup battery as well as the vehicle battery and power supply. Antenna tuning unit 38 not only acts as an impedance match for antenna 40 broadcasting at, for example, in the United States 173.075 MHz, but it also controls the operation of transmitter 34 and receiver 36. Normally, antenna tuning unit 38 defaults to operational receiver 36 placing it in the listening mode awaiting an actuation signal being broadcast from RTU 18 through antenna 16 FIG. 1. Once it receives that actuation signal antenna tuning unit 38 then begins operating transmitter 34.

Figure 3:
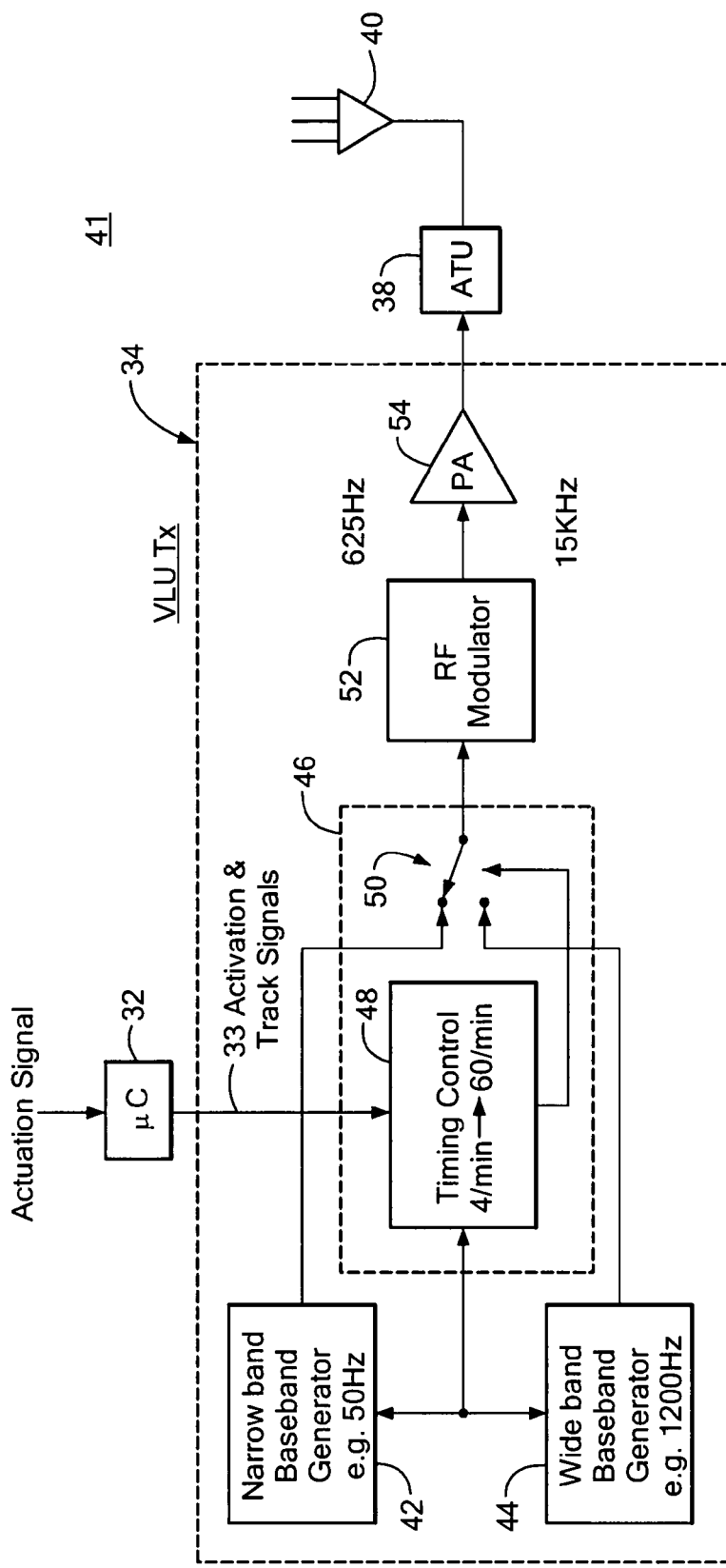
FIG. 3 is a more detailed schematic block diagram of the transmitter of FIG. 2 according to this invention.

In adaptive range system 41, FIG. 3, in accordance with this invention transmitter 34 includes narrowband baseband generator 42, FIG. 3, which generates, for example, a 50 Hz baseband signal and wideband baseband generator 44, which generates for example a 1200 Hz baseband signal. Timing control circuit 46 includes timing control 48 and switching circuit 50.

Upon receiving an actuating input, microprocessor 32 provides an actuation signal on line 33 to timing control 48 to selectively send out a narrow baseband signal from generator 42 and wideband baseband signal from generator 44. Initially in response to this activation signal from microprocessor 32 timing control 48 sends these signals out at the rate of 4/min. It does so by controlling operation of switching circuit 50. RF modulator 52 produces a 625 Hz signal from the 50 Hz signal and a 15 kHz signal from the 1200 Hz signal. Note that these various frequencies (50 Hz, 1200 Hz, 625 Hz, 15 kHz, and 173.05 MHz) are approximate only and further are arbitrary and designers choice and may vary from application to application and country to country and form no part of this invention.

From modulator 52 the signal is submitted to power amplifier 54 and then finally through antenna tuning unit 38 to antenna 40 which radiates the 173.05 MHz signal. The first activation signal from microprocessor 32 to timing control 48 causes VLU 10 to begin its broadcasting four times per minute, or every 15 seconds for the narrowband and the wideband signal. Subsequently when a vehicle tracking unit (VTU), typically in a police cruiser, receives a signal identifying that the signal is coming from a VLU, the officer may query the dispatcher by computer, telephone, radio or some other means. At this point the identification of the VLU is confirmed and a reply with more unique information is delivered. At the same time a signal is delivered to microprocessor 32 which in turn send a track signal on line 33 to timing control 48 to increase the signal rate from approximately 4 per min., for example, to approximately 60 per min., for example. At this point microprocessor 32 can alternatively cease broadcasting the narrowband signal completely or it can keep it at approximately 4 per min while broadcasting the wideband signal at approximately 60 per min. or it can broadcast the narrowband signal at some rate other than 4 or 60 per min. Broadly, the narrowband and wideband signals are broadcast at first and second rates which can be the same rate (e.g. four times per minute). Then one of them (e.g. the narrow band) could be dropped to a third lower rate (e.g. to zero) while the other (e.g. the wideband) is kept the same (e.g. four times per minute). Or one of them (e.g. the narrow band) would be kept at the first rate (e.g. four times per minute) while the other one (e.g. the wideband) could be switched to a third, higher, rate (e.g. sixty times per minute). Or the wideband could be kept at a second rate (e.g. four or sixty times per minute) while the narrowband first rate is changed to something other than four or sixty times per minute.

Figure 4:
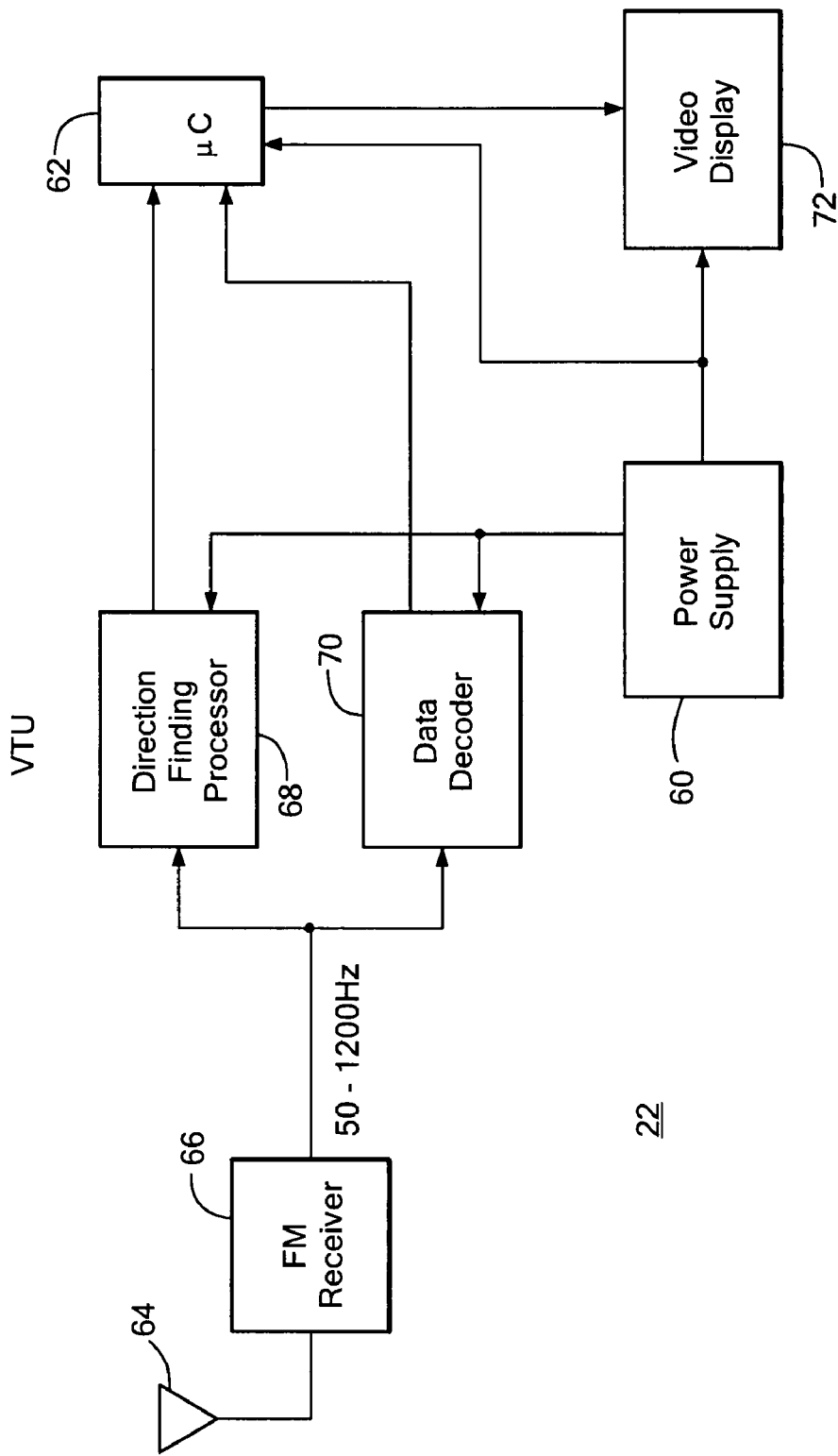
FIG. 4 is a more detailed schematic block diagram of the VTU of FIG. 2 according to this invention.

VTU 22, FIG. 4, also includes power supply 60, microprocessor 62 and an antenna 64. Antenna 64 responds to the 173.05 MHz signal which it provides to the FM receiver 66. FM receiver 66 communicates the narrowband 50 Hz and the wideband 1200 Hz baseband signals to direction finding processor 68 and data decoder 70. There is also a video display 72 which may be disposed in the police cruiser. When VTU 22 has detected the narrowband signal, video display 72 displays a message indicating that a LoJack vehicle locating unit is indeed the source of the signal and the direction of the signal. Subsequently, when the wideband signal is received, video display 72 may still display a message indicating that the signal is originating from a LoJack vehicle locating unit and the direction of that unit will also supply a VLU identification code (reply code). Using this reply code the officer can then query and find the VIN of the vehicle that carries the vehicle locating unit. Once the officer has this he will have complete information about the vehicle make, model, year, color, registration and the like.

Figure 5:
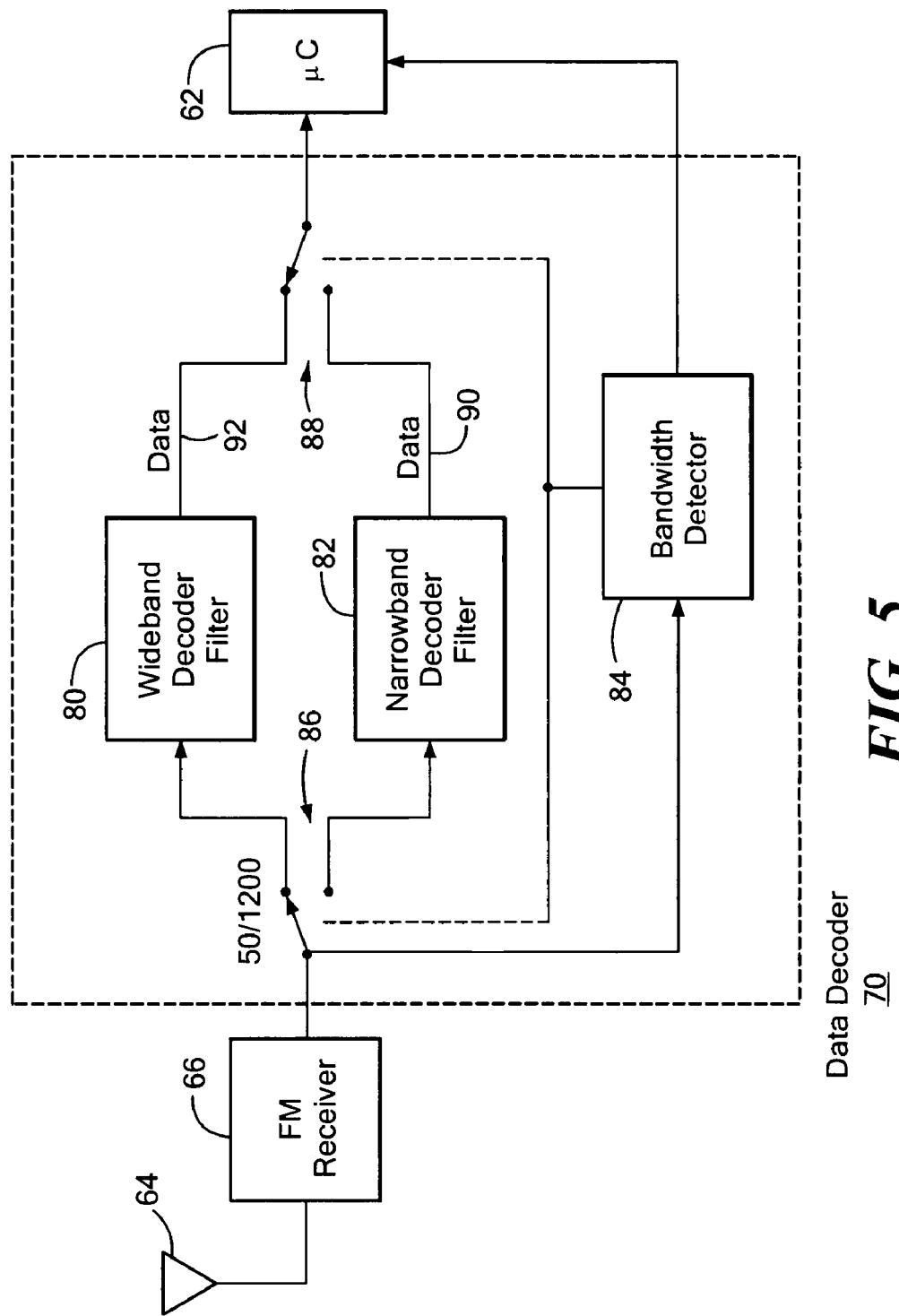
FIG. 5 is a more detailed schematic block diagram of the data decoder of FIG. 4 according to this invention.

In accordance with this invention the data decoder 70, FIG. 5, includes wideband decoder 80, narrowband decoder 82 and bandwidth detector 84 as well as input switching circuit 86 and output switching circuit 88.

In operation, bandwidth detector 84 senses the narrow and wide bandwidth signals e.g. 50 Hz and 1200 Hz, respectively, arriving from FM receiver 66. If bandwidth detector 84 detects a narrowband signal, it operates switch 86 to direct the incoming signal to narrowband decoder filter 82. If bandwidth detector 84 detects a wideband signal it operates switch 86 to direct the incoming signal to wideband decoder filter 80. Whichever decoder 80 or 82 has received the signal provides the data output to switch 88. Bandwidth detector 84 also operates switching circuit 88 so that the one of decoders 80 or 82 that is receiving the input has its output connected to microprocessor 62 through switch 88. The data on line 90 from narrowband decoder filter 82 includes non-unique identification that identifies that this is truly a LoJack vehicle locating unit, while the data on line 92 from wideband decoder filter 80 indicates that information as well as a reply code which includes a unique ID for the particular VLU that is broadcasting. The police officer in the cruiser can then use that unique ID from the VLU to find the VIN of the vehicle in which it is installed and with the VIN determine the make, model, color, year and other features of the vehicle that he is tracking. The use of the narrow and wideband signals in this combination provides unique benefits. A narrowband signal requires a narrower filter; a narrower filter removes more noise and therefore makes the receiver more sensitive, and therefore it has increased range. As a result of this increased range, typically the range is doubled: from one to two miles; the vehicle tracking units in the police cruisers can acquire a signal from an activated VLU in a stolen vehicle at a far greater distance, e.g. approximately 2 miles as opposed to 1 mile. Equally as important, since each VTU has roughly doubled its range the number of tracking units can be reduced by a factor of four. That is, a given area may be monitored for activated stolen VLU's using one-fourth the number of vehicle tracking units heretofore required.

Figure 6:
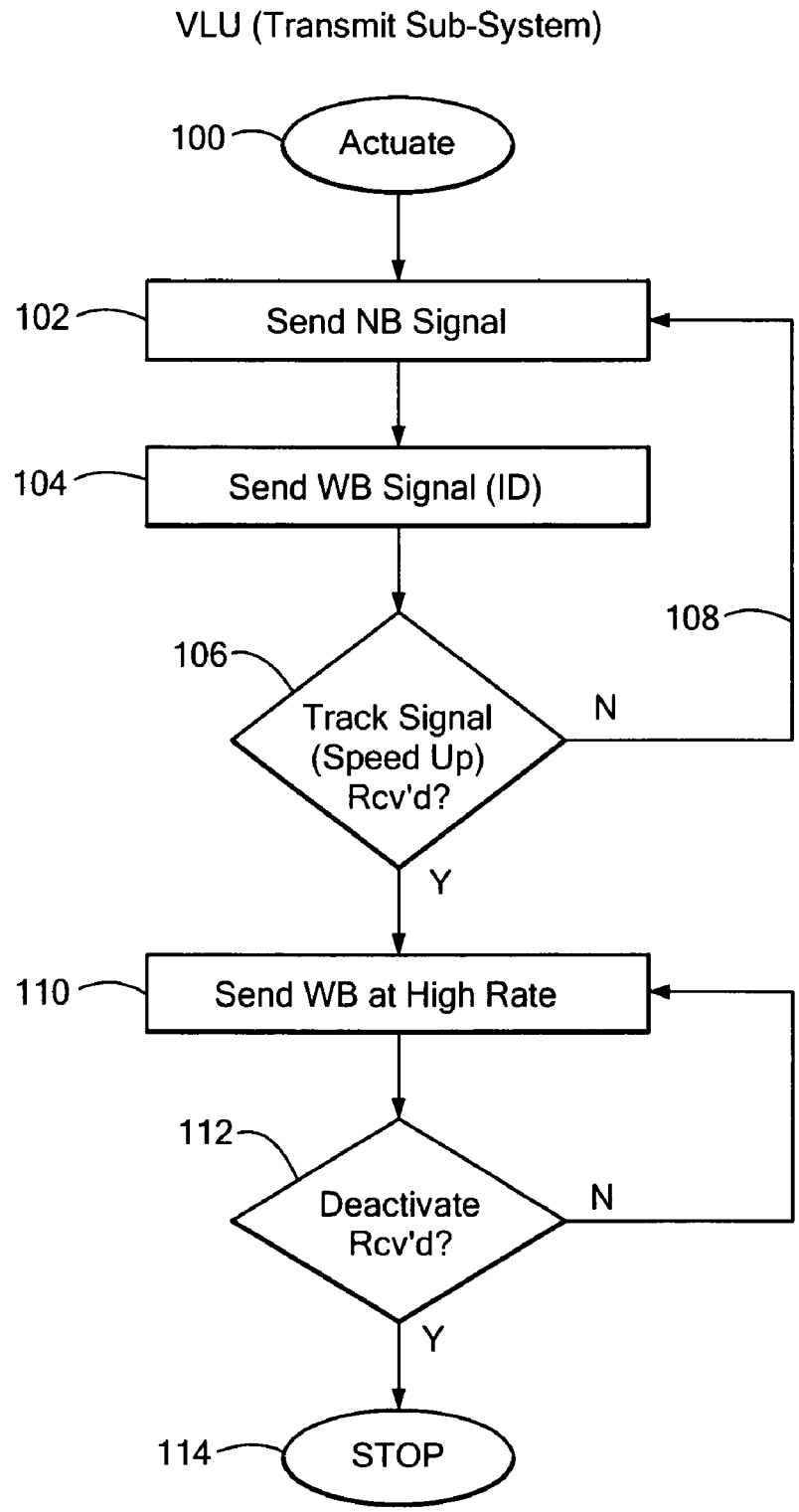
FIG. 6 is a logic flow chart of the operation of the timing control of FIG. 3.
Figure 7:
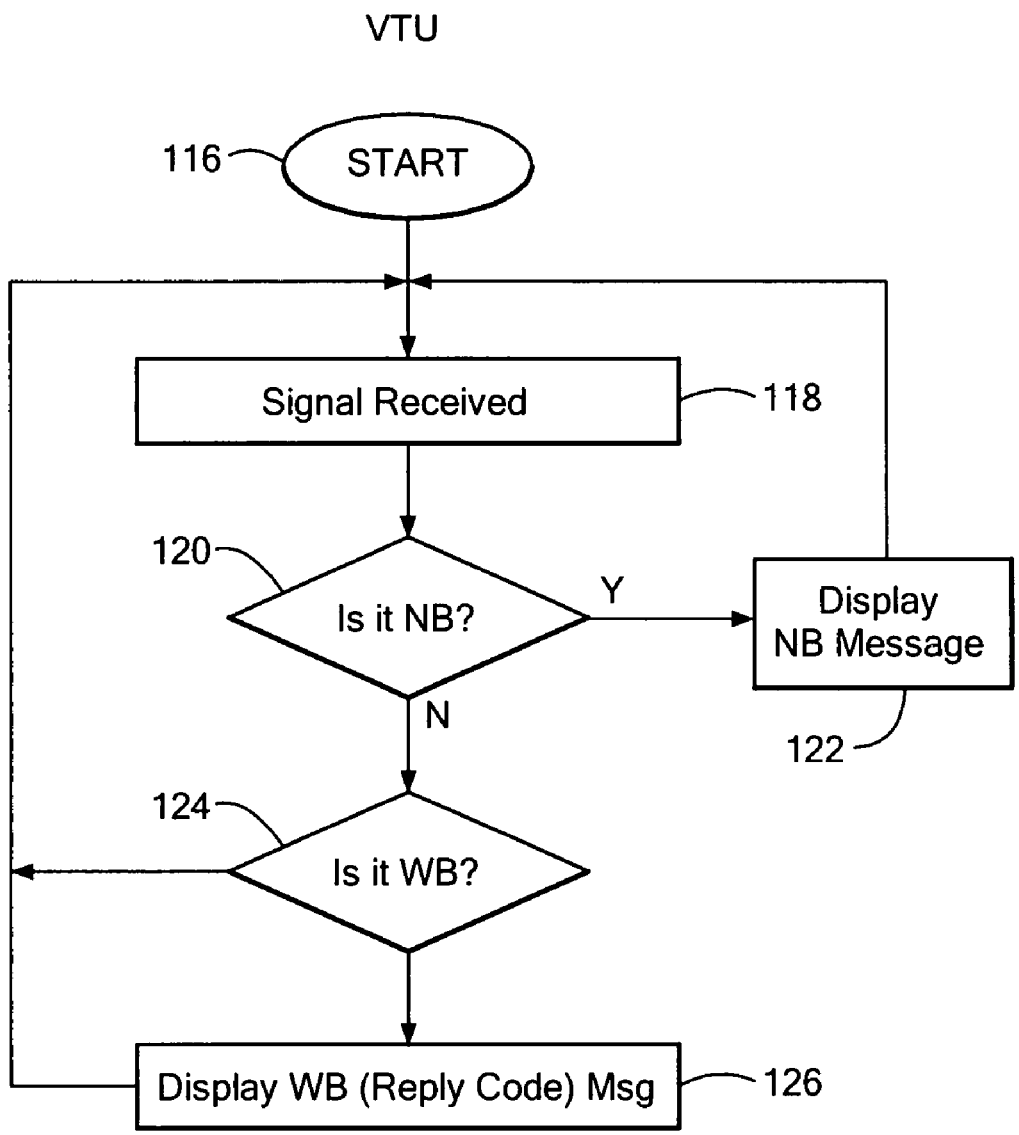
FIG. 7 is a logic flow chart of the operation of the data decoder of FIG. 4.

The logic of timing control circuit 46, FIG. 3, is shown in FIG. 6 where upon receipt of the actuation signal 100 a narrow band signal is sent 102 followed by a wideband signal 104. Inquiry is then made as to whether a trace signal has been received from the dispatcher at 106, if not the system loops through 108 back to sending the narrowband signal 102 followed by sending the wideband signal 104. If the track signal has been received then the wideband signal is now sent at a higher rate 110, for example from four broadcasts per minute to sixty broadcasts per minute. At the same time the narrow band signal may be eliminated, may be maintained at four broadcasts per minute or may be switched to some other greater or lesser rate. Once the wideband signal is being broadcast at the higher rate, the system then checks to see whether a deactivation signal has been received from the dispatcher 112. If not, then the wideband signal continues to be sent 110 at the higher rate. If the deactivate signal has been received the system simply stops sending signals. The logic operation of data decoder 70 FIG. 5 is shown in FIG. 7. Once the system is started 116 a check is made to see if the signal is received 118. If it is, an inquiry is made as to whether it is a narrowband signal 120. If it is narrowband signal then there is displayed the narrowband signal message 122 which indicates that a LoJack vehicle locating unit is the source of the signal and indicating a direction. If it is not a narrowband signal then inquiry is made 124 as to whether it is a wideband signal. If it is not a wideband signal the system returns to the start condition and checks to see if the signal is being received at 118. If it is a wideband signal then a display is made of the reply code 126 identifying a specific VLU which the officer in the police cruiser can now use, for example, to find the VIN number and with it all of the other identifying information of the stolen vehicle in which the VLU is located.

Figure 8:
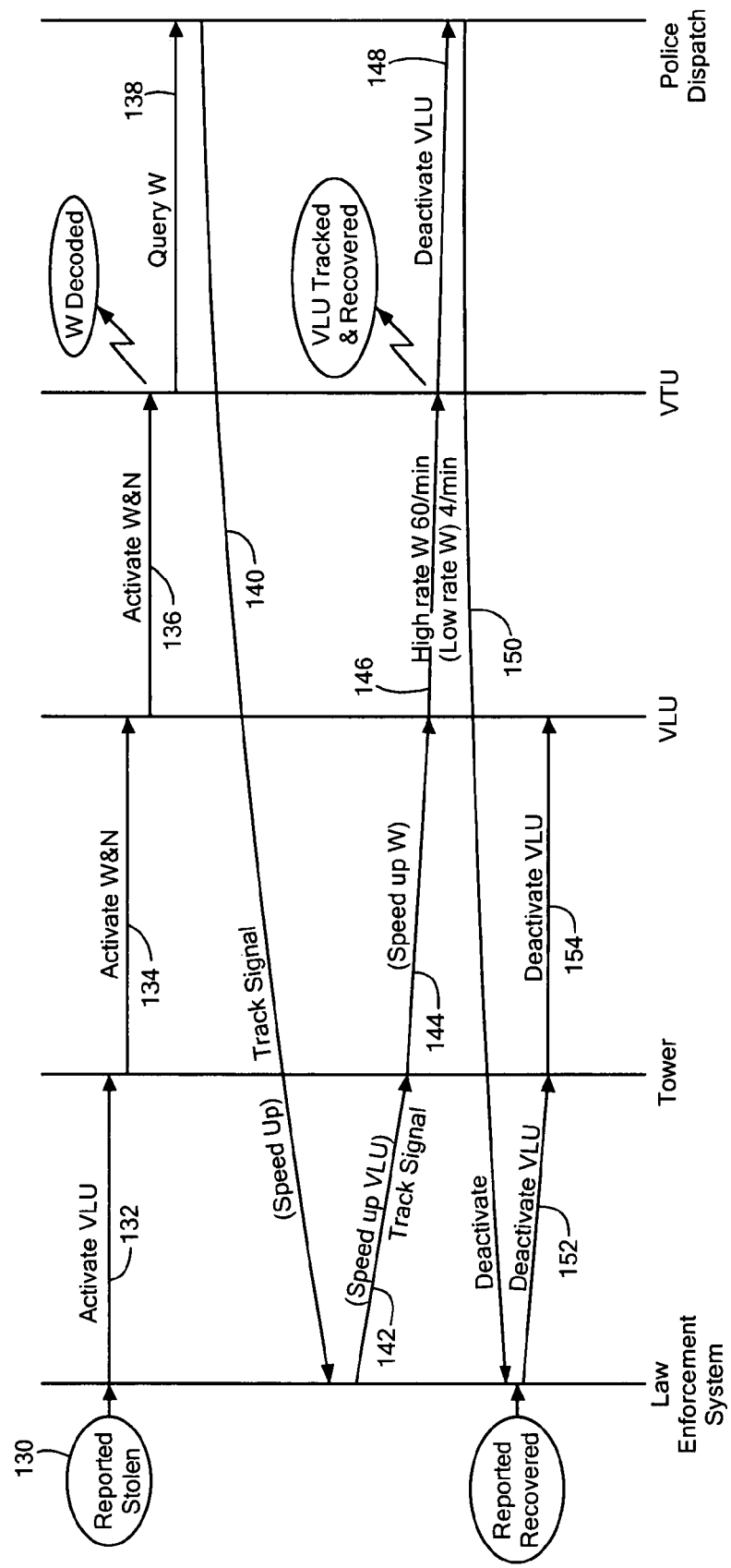
FIG. 8 illustrates an operation sequence of a vehicle recovery system with vehicle locating and vehicle tracking units according to this invention.

The overall operation of the system is depicted in FIG. 8. When the vehicle is reported stolen 130 the law enforcement system sends the signal 132 to activate the VLU installed in the stolen vehicle. The tower then sends out an actuation signal at 134 to start the wide and narrowband broadcasts and the VLU then begins providing the alternate wide and narrow broadcasts 136. When the VTU in the police cruiser is close enough to the stolen vehicle and the broadcasting VLU to detect the wideband signal it receives the reply code identifying the specific VLU and the officer can then make inquiries, for example, the VIN of the vehicle, after which through police channels he can acquire all the other information make, model, year, color of the stolen vehicle. At the same time the police dispatcher sends out the track signal to speed up the broadcast of the wideband signal 140. When the dispatcher speed up request reaches the law enforcement system it sends a signal 142 to the tower to speed up the VLU. The tower then sends out the track signal, speed up wideband signal command 144. The VLU then starts broadcasting the wideband at a higher rate 146, for example, 60 times per minute and either changes the narrowband signal rate from 4 times per minute to some other rate or leaves it at the 4 times per minute or stops the narrowband signal entirely. The VLU is now being closely tracked by the VTU and will be recovered. Once it's recovered a deactivate command 148 is sent to police dispatch to deactivate the wideband signal. The police dispatcher sends that deactivate signal 150 to the law enforcement system, which now reports that the vehicle has been recovered and responds with a deactivate signal 152 to the tower which then broadcasts the deactivate signal 154 to the VLU.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An adaptive range vehicle locating unit comprising:
    a narrowband baseband generator for generating a narrowband signal;
    a wideband baseband generator for generating a wideband signal; and
    a timing control circuit responsive to an activation signal to transmit, alternately, said narrowband signal at a first rate, and said wideband signal at a second rate and responsive to a track signal to transmit one of said wideband and narrowband signals at a third, different, rate.

2. The adaptive range vehicle locating unit of claim 1 in which said first rate and second rate are the same.

3. The adaptive range vehicle locating unit of claim 1 in which said third rate is higher than said first and second rate.

4. The adaptive range vehicle locating unit of claim 1 in which said timing control circuit is responsive to said track signal to turn off said narrowband baseband generator effectively setting said third rate to zero.

5. The adaptive range vehicle locating unit of claim 4 in which said second rate is approximately four times a minute.

6. The adaptive range vehicle locating unit of claim 1 in which said timing control circuit is responsive to said track signal to change said wideband signal from said second rate to said third rate which is higher.

7. The adaptive range vehicle locating unit of claim 6 in which said first rate is approximately four times per minute and said second rate is changed to said third rate which is approximately sixty times per minute.

8. The adaptive range vehicle locating unit of claim 1 in which said timing control circuit is responsive to said track signal to keep said wideband signal at said second rate or change it to said third rate which is higher and change said narrowband signal rate to a fourth rate other than said third rate.

9. The adaptive range vehicle locating unit of claim 8 in which said third rate is one of approximately four times per minute and approximately sixty times a minute and said fourth rate is neither.

10. The adaptive range vehicle locating unit of claim 1 in which said timing control circuit is responsive to said track signal to keep said wideband signal at said second rate or change it to a narrowband signal at said first rate.

11. The adaptive range vehicle locating unit of claim 1 in which said first rate and said second rate are approximately four times a minute.

12. The adaptive range vehicle locating unit of claim 1 in which said narrowband baseband is approximately 50 Hz.

13. The adaptive range vehicle locating unit of claim 1 in which said wideband baseband is approximately 1200 Hz.

14. The adaptive range vehicle locating unit of claim 1 in which said narrowband baseband signal carries general data identifying the signal as from a vehicle locating unit.

15. The adaptive range vehicle locating unit of claim 1 in which said wideband baseband signal carries unique data identifying the vehicle in which the vehicle locating unit is disposed.

16. An adaptive range vehicle recovery system comprising:
    an adaptive range vehicle locating unit including a narrowband baseband generator for generating a narrowband signal, a wideband baseband generator for generating a wideband signal, a timing control circuit responsive to an activation signal to transmit, alternately, said narrowband signal at a first rate, and said wideband signal at a second rate and responsive to a track signal to transmit one of said wideband and narrowband signals at a third, different, rate; and an adaptive range vehicle tracking unit including a data decoder including, a wideband decoder for detecting data from a wideband baseband signal, a narrowband decoder for detecting data from a narrowband baseband signal, a bandwidth detector responsive to a received signal to distinguish said narrowband and wideband signals and an input switching circuit responsive to said bandwidth detector for directing said wideband signal to said wideband decoder and the narrowband signal to the narrowband decoder.

17. The adaptive range vehicle recovery system of claim 16 in which said narrowband signal is turned off in response to said track signal.

18. The adaptive range vehicle recovery system of claim 16 in which said narrowband signal is continued to be transmitted at said first rate in response to said track signal.

19. The adaptive range vehicle recovery system of claim 16 in which said narrowband signal is transmitted at a third rate in response to said track signal.

20. The adaptive range vehicle recovery system of claim 16 in which said first rate is approximately four times per minute.

21. The adaptive range vehicle recovery system of claim 16 in which said second rate is approximately sixty times per minute.

22. The adaptive range vehicle recovery system of claim 16 in which said narrowband baseband is approximately 50 Hz.

23. The adaptive range vehicle recovery system of claim 16 in which said wideband baseband is approximately 1200 Hz.

24. The adaptive range vehicle recovery system of claim 16 in which said narrowband baseband signal carries general data identifying the signal as from a vehicle locating unit.

25. The adaptive range vehicle recovery system of claim 16 in which said wideband baseband signal carries unique data identifying the vehicle in which the vehicle locating unit is disposed.

26. The adaptive range vehicle recovery system of claim 16 in which said data decoder further includes a second switching circuit responsive to said bandwidth detector for selecting the output of said narrowband or wideband decoder corresponding to the decoder to which the received signal was directed.

27. The adaptive range vehicle recovery system of claim 26 in which said data decoder further includes a microprocessor and said second switching circuit connects the selected filter output to said microprocessor.

28. The adaptive range vehicle recovery system of claim 16 in which said narrowband signal is an approximately 625 Hz signal with an approximately 50 Hz baseband and said wideband signal is an approximately 15 kHz signal with an approximately 1200 Hz baseband.

29. The adaptive range vehicle recovery system of claim 16 in which said first rate and second rate are the same.

30. The adaptive range vehicle recovery system of claim 16 in which said third rate is higher than said first and second rate.

31. The adaptive range vehicle recovery system of claim 16 in which said timing control circuit is responsive to said track signal to turn off said narrowband circuit effectively setting said third rate to zero.

32. The adaptive range vehicle recovery system of claim 16 in which said timing control circuit is responsive to said track signal to change said wideband signal from said second rate to said third rate which is higher.

33. The adaptive range vehicle recovery system of claim 16 in which said timing control circuit is responsive to said track signal to keep said wideband signal at said second rate or change it to said third rate which is higher and change said narrowband signal rate to a fourth rate other than said third rate.

34. The adaptive range vehicle recovery system of claim 16 in which said timing control circuit is responsive to said track signal to keep said wideband signal at said second rate or change it to a narrowband signal at said first rate.

\* \* \* \* \*